(12) United States Patent
Bochare et al.

(10) Patent No.: US 12,124,570 B2
(45) Date of Patent: Oct. 22, 2024

(54) SYSTEM AND METHOD TO BUILD A FILE REPUTATION CACHE FOR AN ANTIVIRUS (AV) ENDPOINT

(71) Applicant: VMWARE, INC., Palo Alto, CA (US)

(72) Inventors: Sachin Pandurang Bochare, Pune (IN); Amol Shivram Katkar, Pune (IN); Vasantha Kumar Dhanasekar, Pune (IN)

(73) Assignee: VMware LLC, Palo Alto, CA (US)

( * ) Notice: Subject to any disclaimer, the term of this patent is extended or adjusted under 35 U.S.C. 154(b) by 363 days.

(21) Appl. No.: 17/392,449

(22) Filed: Aug. 3, 2021

(65) Prior Publication Data

US 2022/0358213 A1 Nov. 10, 2022

(30) Foreign Application Priority Data

May 10, 2021 (IN) .............................. 202141021118

(51) Int. Cl.
*G06F 21/55* (2013.01)
*G06F 21/56* (2013.01)
(52) U.S. Cl.
CPC .......... *G06F 21/552* (2013.01); *G06F 21/554* (2013.01); *G06F 21/565* (2013.01); *G06F 21/566* (2013.01)
(58) Field of Classification Search
CPC .... G06F 21/552; G06F 21/554; G06F 21/565; G06F 21/566
See application file for complete search history.

(56) References Cited

U.S. PATENT DOCUMENTS

2021/0097569 A1* 4/2021 Devane ............... H04L 63/1425
2021/0320871 A1* 10/2021 Savarese ................. G06N 20/00

FOREIGN PATENT DOCUMENTS

WO WO-2020210538 A1 * 10/2020 ....... G06F 16/24537
WO WO-2020263917 A1 * 12/2020 ........... H04L 63/102

OTHER PUBLICATIONS

Ammar Ayman Battah • Youssef Iraqi • Ernesto Damiani; A Trust and Reputation System for IoT Service Interactions; IEEE Transactions on Network and Service Management (vol. 19, Issue: 3, 2022, pp. 2987-3005); (Year: 2022).*
Huaqing Lin • Zheng Yan • Raimo Kantola; CDController: A Cloud Data Access Control System Based on Reputation; 2017 IEEE International Conference on Computer and Information Technology (CIT) (2017, pp. 223-230); (Year: 2017).*
Xin Tang • Yining Qi • Yongfeng Huang; Reputation Audit in Multi-cloud Storage through Integrity Verification and Data Dynamics; 2016 IEEE 9th International Conference on Cloud Computing (CLOUD) (2016, pp. 624-631); (Year: 2016).*

* cited by examiner

*Primary Examiner* — Luu T Pham
*Assistant Examiner* — Chao Wang
(74) *Attorney, Agent, or Firm* — King Intellectual Asset Management

(57) ABSTRACT

Example methods are provided to build a smart file reputation cache at a cloud, and to provide the smart file reputation cache to an antivirus (AV) endpoint such as a virtualized computing instance in a virtualized computing environment. Training techniques can be used to build the smart file reputation cache at the cloud, based on information learned from existing AV endpoints and a management server. The smart file reputation can then be provided to newly installed AV endpoints for local access, instead of the AV endpoints sending file reputation requests to the cloud.

21 Claims, 6 Drawing Sheets

SYSTEM AND METHOD TO BUILD A FILE REPUTATION CACHE FOR AN ANTIVIRUS (AV) ENDPOINT

RELATED APPLICATION

Benefit is claimed under 35 U.S.C. 119(a)-(d) to Foreign Application Serial No. 202141021118 filed in India entitled "SYSTEM AND METHOD TO BUILD A FILE REPUTATION CACHE FOR AN ANTIVIRUS (AV) ENDPOINT", on May 10, 2021, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

However, a virtualized computing environment having hosts that support VMs is often vulnerable to malware, viruses, rootkits, spyware, or other types of malicious code. For example, application or files of a VM may be infected by malicious code that post a threat to the VM and/or to other parts of the virtualized computing environment. These types of threats are also present in other types of computing environments/devices.

File reputation techniques are examples of threat detection techniques that may be used in a virtualized computing environment or other types of computing environments. Generally with some file reputation techniques, a hash of a file is created and compared with hashes stored in a file reputation database (often at a cloud). If the comparison indicates a mismatch between the hashes, then the file may be considered to be potentially infected with malicious code or other malicious content and unfit for further processing, and so the execution of the file may be stopped.

However, current file reputation techniques are inefficient, and have drawbacks such as delaying the execution process for a file, undue usage of computing resources, etc.

DETAILED DESCRIPTION

Figure 1:
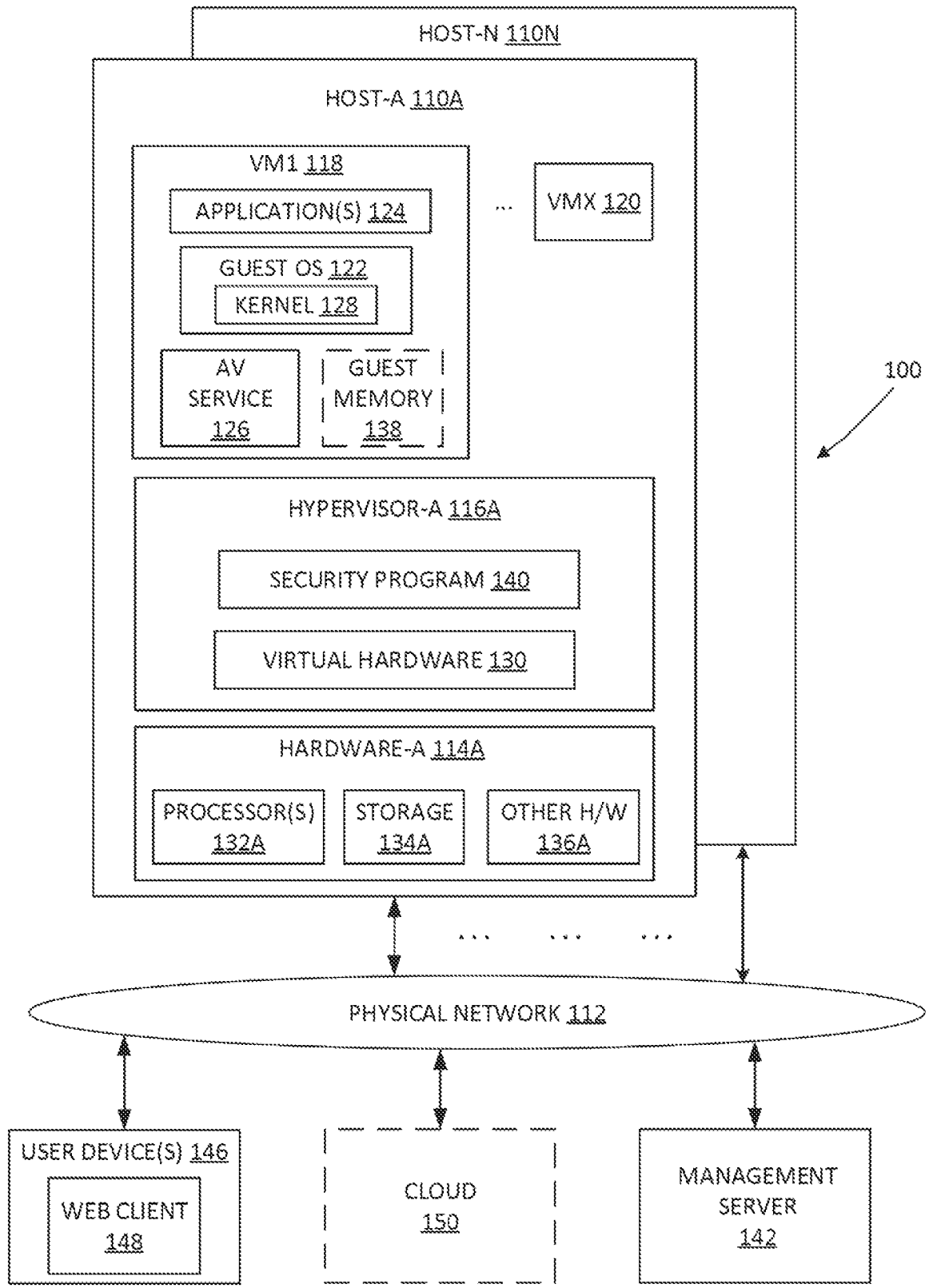
FIG. 1 is a schematic diagram illustrating an example virtualized computing environment that can implement a method to build and use a file reputation cache for an antivirus (AV) endpoint.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the drawbacks of current file reputation techniques that are used for detecting threats. The embodiments described herein may be used in a virtualized computing environment, wherein virtualized computing instances such as virtual machines (VMs) are provided with antivirus (AV) capability that enable the detection of viruses, malware, and other malicious code that may have infected the VMs or elements thereof (such as files of the VM). Such VMs may thus be referred to herein as an AV endpoint that uses file reputation techniques to detect threats. The VMs may operate in conjunction with both a local file reputation cache and a cloud that provides a file reputation service, in a manner (as will be described later below) that is different from current file reputation techniques that rely on a cloud service and/or on a local file reputation cache.

For existing file reputation techniques, many AV vendors maintain file reputations in the cloud. When needed, AV endpoints query for a file reputation from the cloud in order to verify whether an application and/or its related sub-components and data (all collectively referred to herein as a file) can be trusted (e.g., is not infected with malicious code) and allowed to execute. Often, AV software at the AV endpoint may pause certain operations/execution in the AV endpoint until the file reputation is obtained/verified from the cloud.

To generally improve performance, some techniques involve building a file reputation cache locally at a host of the AV endpoint, with a rationale being that after the file reputation cache is built locally, verification of the file reputation may be performed more quickly and more efficiently by querying the file reputation cache rather than repeatedly requesting/querying the cloud for file reputations. However, the initial building of the file reputation cache is a costly operation, and involves multiple processes of calculating (by the AV endpoint) the hash of each file, and then using the hashes to request the file reputations from the cloud.

Also, AV endpoints may have limited resources (e.g., processor, memory, network, disk, etc. resources), and so building a huge file reputation cache that fully replicates file reputations at the cloud adds overhead during runtime. Moreover, the cloud may maintain file reputations for billions of files, but at the AV endpoint, the file reputation cache needs to store limited and relevant reputations for files (rather than additionally storing lesser used or non-relevant file reputations that are all stored at the cloud).

Typically, an AV endpoint may build a file reputation using two methods. In a first method, the AV endpoint sends requests to the cloud for the reputation of files as a result of real-time system operations such as a file execution, file drop on the system, file close, file write, etc. The file reputations received from the cloud may then be locally cached for future use, when needed. A problem with this first method/approach is that the approach has a detrimental performance impact on the runtime execution of applications at the AV endpoint. For example, such approach can cause delays in execution and holding of critical resources on the system, until after the file reputations are received/verified from the cloud.

A second approach for building a file reputation cache involves performing a background scan of the entire file system (e.g., a filesystem crawl), and then populating the entries in the file reputation cache one-by-one via non-real time or asynchronous file reputation requests to the cloud or as part of consolidated file reputation requests to cloud. A problem with this second method/approach is that building the potentially huge file reputation cache based on the entire filesystem crawl is very resource intensive and is not optimum.

Accordingly to address at least the foregoing drawbacks, the embodiments described herein provide a file reputation request/response protocol for locally caching file reputations at AV endpoints, in a manner that reduces the amount of file reputation requests sent to a cloud service (e.g., the AV endpoints can locally query the file reputation cache instead) and in a manner that the file reputation cache can be built as a smart or intelligent file reputation cache that stores the most relevant or potentially relevant file reputations (e.g., as opposed to caching large amounts of file reputations from the cloud or from an entire filesystem crawl). Also and as will be further described below, an intelligent cloud service can be provided that prepares consolidated file reputation caches for AV endpoints which are newly installed and recently registered with the cloud service.

Computing Environment for a Smart File Reputation Cache

To further explain the operations of the elements that may cooperate to provide a smart file reputation cache, various implementations will now be explained in more detail using FIG. 1, which is a schematic diagram illustrating an example virtualized computing environment 100 that can implement a method to build and use a file reputation cache for an antivirus (AV) endpoint. Depending on the desired implementation, virtualized computing environment 100 may include additional and/or alternative components than that shown in FIG. 1.

It is understood that the virtualized computing environment 100 is one example of a computing environment in which the methods described herein may be used. Methods to build and use a file reputation cache for an AV endpoint may be implemented in other embodiments for other types of computing environments, including computing environments having physical endpoints (alternatively or in addition to endpoints that are comprised of virtualized computing instances) such as laptops, physical servers, mobile devices, desktop computers, etc.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be a guest VM that includes a guest operating system (OS) 122 and one or more guest applications 124 (and their corresponding processes) that run on top of the guest OS 122. The guest OS 122 includes a kernel 128. VM1 118 may be an example of an AV endpoint in configurations wherein VM1 118 includes AV software or other AV capability. For example, VM1 118 may include an AV service 126. The AV service 126 of various embodiments may run as part of the guest OS 122 or may run/reside outside of the guest OS 122. Among other things, the AV service 126 performs security-related operations such as generating a hash of a file, requesting a file reputation locally from a file reputation cache or from a cloud, storing and updating a file reputation cache, comparing a hash of a file with a hash provided by a file reputation so as to determine whether a file is valid and allowed to execute, generating an alarm if a file fails verification, etc. Further details of the features and use of the AV service 126 will be described later below with respect to FIGS. 2-6.

For the sake of explanation, the AV service 126 is described herein in the context of being a service and/or is referred to generally as a service. It is to be appreciated that other embodiments may provide an engine, driver, module, agent, application, daemon, or other type of code or computer-executable instructions (all of which may also be generally referred to herein as a service, for the sake of explanation) that can perform the same or similar operations as the AV service 126. Such service(s) in VM1 118 may be part of the guest OS 122 or may be separate from or external to the guest OS 122.

One or more of the guest OS 122, the guest application(s) 124, the AV service 126, and other code and related data (including data structures) associated with operating VM1 118 may be stored in a guest memory space that is provisioned for VM1 118 and/or in some other storage location in host-A 110A. The guest memory space allocated/provisioned for VM1 118 is graphically represented by a guest memory 138 shown in broken lines in FIG. 1. The guest memory 138 may store a file reputation cache, as will be described later below.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs.

In one embodiment, a security program 140 may run on top of or within the hypervisor-A 116A. In the example embodiment of FIG. 1, the security program 140 is depicted as running within or as part of the hypervisor 116A. In other embodiments, the security program 140 may run within or may be installed at other locations within the host-A 110A. In some embodiments, the AV service 126 may be part of, cooperate with, or controlled by the security program 140.

Also, the security program 140 may include distributed sub-elements. For instance, one sub-element of the security program 140 may be embodied as the AV service 126 and/or other security element in VM1 118 (such as a peer guest module installed in VM1 118 and that performs security-related operations in addition to those performed by the AV service 126). Another sub-element of the security program 140 may reside in the hypervisor-A 116A and/or elsewhere in the host-A 110A. Yet another sub-element of the security program 140 may reside in some other standalone device(s), such as at a management server 142 and/or other device. For the sake of simplicity of illustration, at least some of these distributed sub-elements of the security program 140 are collectively shown in FIG. 1 as the security program 140 residing in the hypervisor-A 116A.

The security program 140 may be configured in one embodiment to receive alerts from the AV service 126 about possible malicious code, and to take a remedial action in response to an alert from the AV service 126. For example, the security program 140 may take remedial actions such as shutting down VM1 118, disabling the guest OS 122, deleting malicious code, sending a report to the management server 142 so as to enable a system administrator to further evaluate the alert(s) from the AV service 126, etc.

Hardware 114A includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including the guest memory 138), a virtual disk, a virtual network interface controller (VNIC), etc. In some embodiments, the virtual disk (supported by physical storage disks) may be used for local storage of file reputations by a VM, alternatively or additionally to caching the file reputations in the guest memory 138.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionality of the management server 142 may be accessed via one or more user devices 146 that are operated by a system administrator. For example, the user device 146 may include a web client 148 (such as a browser-based application) that provides a user interface operable by the system administrator to view and evaluate alerts provided by the security program 140 to the management server 142. The system administrator may then operate the user interface of the web client 148 to facilitate the implementation of a remedial action, such as shutting down a VM, disabling a guest OS, debugging, troubleshooting, etc.

The management server 142 may be communicatively coupled to host-A 110A . . . host-N 110N (and hence communicatively coupled to the virtual machines, hypervisors, agents, drivers, applications and modules, hardware, etc.) via the physical network 112. The host-A 110A . . . host-N 110N may in turn be configured as a data center that is managed by the management server 142. In some embodiments, the functionality of the management server 142 may be implemented in any of host-A 110A . . . host-N 110N, instead of being provided as a separate standalone device such as depicted in FIG. 1.

A cloud 150 can be communicatively coupled to the physical network 112, and hence can be accessible by and can communicate with one or more of the hosts, VMs, management server 142, user device 146, and other elements shown in FIG. 1. The cloud 150 can be a private cloud or a public cloud, and can include servers, storage devices, and other types of devices and resources. The cloud 150 can comprise a distributed system in some embodiments, and is therefore depicted in broken lines in FIG. 1. As will be described further below, the cloud 150 can be provided with capabilities to store, build, consolidate, and provide file reputations for use by the VMs.

Depending on various implementations, one or more of the physical network 112, the management server 142, the cloud 150, and the user device(s) 146 can comprise parts of the virtualized computing environment 100, or one or more of these elements can be external to the virtualized computing environment 100 and configured to be communicatively coupled to the virtualized computing environment 100.

Building and Using a Smart File Reputation Cache

Figure 2:
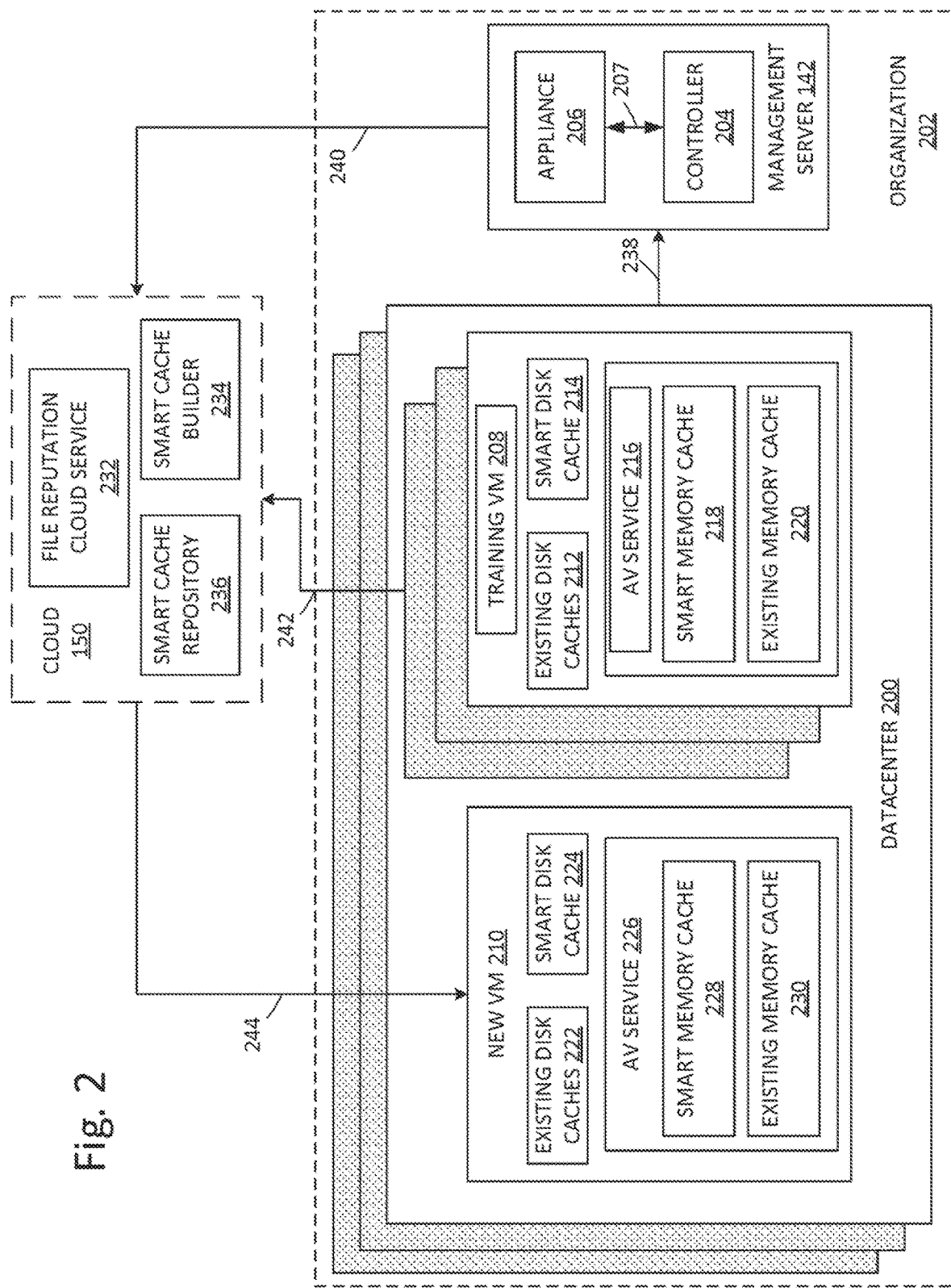
FIG. 2 is a schematic diagram illustrating some of the elements in the virtualized computing environment of FIG. 1 that are involved in a method to build and use a file reputation cache for an AV endpoint, according to a first approach.

FIG. 2. is a schematic diagram illustrating some of the elements in the virtualized computing environment 100 of FIG. 1 that are involved in a method to build and use a file reputation cache for an AV endpoint, according to a first approach. For example, FIG. 2 shows further details of some of the elements of the management server 142, the cloud 150, and the AV endpoints such as the VMs (e.g., VM1 118 shown in FIG. 1) of one or more hosts that may be arranged in one or more datacenters 200.

An individual management server 142 may be part of and/or may manage an individual datacenter 200, or an individual management server 142 may be part of and/or may manage multiple datacenters 200. As shown in the example arrangement of FIG. 2, the datacenter(s) 200 and the management server 142 may be part of an organization 202, with the cloud 150 being external to the organization 202—although in some embodiments, the cloud 150 may form part of the organization 202.

The management server 142 includes a controller 204 and an appliance 206. The controller 204 and/or the appliance 206 may be embodied in hardware, software, or a combination of hardware and software. The controller 204 is configured to manage or otherwise control the operation of various elements and sub-elements of the datacenter 200. The controller 204 is also configured to manage/control (shown by the arrow 207) the operation of the appliance 206. The appliance 206 is configured to perform AV-related operations, including interacting with the VMs in the datacenter 200 and with the cloud 150, with respect to building and using file reputations.

The VMs in the datacenter 200 include one or more training VMs 208, and one or more newly installed VMs 210. For example, the training VM 208 may be a currently running (previously installed) VM that is interacting with the cloud 150 to make file reputation requests, receive file reputations, maintain/update locally stored file reputations, etc. The training VM 208 is referred to herein as a training VM since the interaction of the VM 208 with the cloud 150 and/or with the appliance 206 is used by the cloud 150 to build a file reputation cache.

The training VM 208 includes one or more existing disk caches 212, which may correspond to virtual disk storage allocated to VM 208 by the hypervisor-A 116A from the storage device(s) 134A in FIG. 1. The existing disk cache 214 may store any content used by the training VM 208, such as application, files, data, code, etc. The training VM 208 may also have a smart disk cache 214. The smart disk cache 214 may be similar to the existing disk cache 212, except that the smart disk cache 214 may be dedicated for storing a file reputation cache in a persistent manner.

The training VM 208 may include an AV service 216 corresponding to the AV service 126 shown in FIG. 1. The AV service 216 may in turn include or be coupled to a smart memory cache 218 and an existing memory cache 220, which may reside in the guest memory 138 shown in FIG. 1. The existing memory cache 220 and the smart memory cache 218 may be similar to the existing disk cache 212 and the smart disk cache 214, respectively, except that the contents in the existing memory cache 220 and the smart memory cache 218 may be more easily and quickly accessed by the AV service 216 via cache access operations, as opposed to performing disk access operations to access the contents of the existing disk cache 212 and the smart disk cache 214.

Thus, the contents of the existing memory cache 220 and/or the smart memory cache 218 may include file reputations that need to be accessed more frequently (e.g., commonly used for verification of file reputations) and/or more quickly (e.g., so as to reduce system latency and delay when performing verification of file reputations) from a smaller-sized cache region. In some embodiments, a comparison of an amount of file reputations stored in the smart memory cache 218 versus an amount of file reputations stored in the smart disk cache 214 can be 10% versus 90%. Other sizing arrangements can be provided.

While FIG. 2 depicts an embodiment wherein there are separate disk caches and memory caches, other embodiments can consolidate these caches into a smaller number (or even just a single) cache, or into a greater number of caches. Thus, the specific number and arrangements of caches shown in FIG. 2 is merely intended to be an example.

The new VM 210 may be a newly installed VM that has not yet made (or has made limited) interactions with the cloud 150 and/or with the management server 142 with respect to file reputations. Over time, the new VM 210 transitions from being a newly installed VM to a training VM 208.

Analogous to the training VM 208, the new VM 210 may include one or existing disk caches 222, a smart disk cache 224, and an AV service 226. The AV service 226 may analogously in turn include a smart memory cache 228 and an existing memory cache 230.

The cloud 150 includes a file reputation cloud service 232 that is configured to generate, store, or otherwise manage file reputations for use by AV endpoints. The cloud 150 further includes a smart cache builder 234 that cooperates with the file reputation cloud service 232 to build a smart cache that contains the most relevant file reputations to be used by AV endpoints. The file reputation cloud service 232 and/or the smart cache builder 234 may be embodied in software, hardware, or a combination of hardware and software. The file reputations built by the smart cache builder 234 may be stored in a smart cache repository 236, and then provided to AV endpoints.

Generally, when an application of an AV endpoint (e.g., the application 124 of VM1 118 shown in FIG. 1) executes, the application 124 loads multiple device link libraries (DLLs) from the application itself and DLLs provided by the guest OS 122. In order to allow execution or to determine the complete reputation of the application, the file reputations for the executable file of the application and the associated DLLs have to be verified as being good/valid.

The execution of the application results in the loading of multiple DLLs, and so an AV endpoint (e.g., the VM 208 or the VM 210 in FIG. 2) serially sends file reputation requests to the file reputation service 232 at the cloud 150. In the organization 202, a sequence of DLLs loaded for an application may be specific to the version of the application and third-party plugins attached to the application. Thus, this may be a unique sequence of file reputation requests that are generated each time a specific application is launched.

Based on information specific to the datacenter 200, such as contextual information regarding clusters, user groups, VM names, and other information, the cloud 150 (e.g., the smart cache builder 234) can perform heuristics to predict the file reputation request that will be generated for an application inside the VM 208, and can store the predicted/generated file reputations in the smart cache repository 236. When the new VM 210 initiates a file reputation request for a DLL of the application, the file reputation cloud service 232 can provide a predicted list of file reputations (from the smart cache repository 236) which is then downloaded to the new VM 210 for local querying, so as to avoid multiple round trips requests between the new VM 210 and the cloud 150. This technique can improve efficiency for internal web applications, third-party applications, or other applications accessed within the datacenter 200.

The foregoing operations are illustrated by way of example in the first approach in FIG. 2. The operations in this first approach are as follows:

The appliance 206 collects (shown at an arrow 238) datacenter and cluster information for endpoints VMs (e.g., the training VM(s) 208) and sends (shown at an arrow 240) that information to the file reputation cloud service 232. This information may be used as training data in order to enable the smart cache builder 234 to build/determine context for the organization 202, for purposes of building a smart file reputation cache to place in the smart cache repository 236.

The collection of information at the arrow 238 may be performed several ways based on the type of architecture involved and the processes that are used. For instance, the information gathered from the datacenter 200 of the organization 202 may be used for other datacenters of the organization 202. In an architecture wherein an individual appliance 206 is part of an individual datacenter 200, multiple appliances may be provided for corresponding multiple datacenters for use in connection with information collection from their respective datacenters.

The training VM(s) 208 sends (as shown by an arrow 242) information pertaining to the VMs to the file reputation cloud service 232. Furthermore, the training VM(s) 208 sends (also shown at the arrow 242) file reputation requests to the file reputation cloud service 232, such as in the manner previously described above for serially sending file reputation requests for DLLs of an application being launched. The file reputation cloud service 232 may in turn respond with a verification that the hashes match. The smart cache builder 234 also uses the information from these file reputation requests and other VM-related information (arrow 242) as training data, in combination with the organization data provided by the appliance 206, so as to build the smart file reputation cache to place in the smart cache repository 236. Thus, for example, the smart cache builder 234 can selectively compile/consolidate multiple file reputations based on a common/similar application for a given organization, in order to build a single smart file reputation that predicts the file reputation needed by the application installed in other VMs in the organization and can cache that smart file reputation in the smart cache repository 236.

The new VM 210 may then be installed and obtains (shown at an arrow 244), such as by directly downloading, the smart file reputation from the smart cache repository 236. The download file reputation may be stored by the new VM 210 in the smart disk cache 224 and/or the smart memory cache 228.

The foregoing first approach of FIG. 2 thus enable direct communication by an AV endpoint with the cloud 150 for obtaining the file reputation to be locally cached, and avoids the need to communicate with the appliance 206 to obtain the file reputation. Such first approach may be suitable for example, for individual AV endpoints that may not be part of the datacenter 200 or the virtualized computing environment 100.

Figure 3:
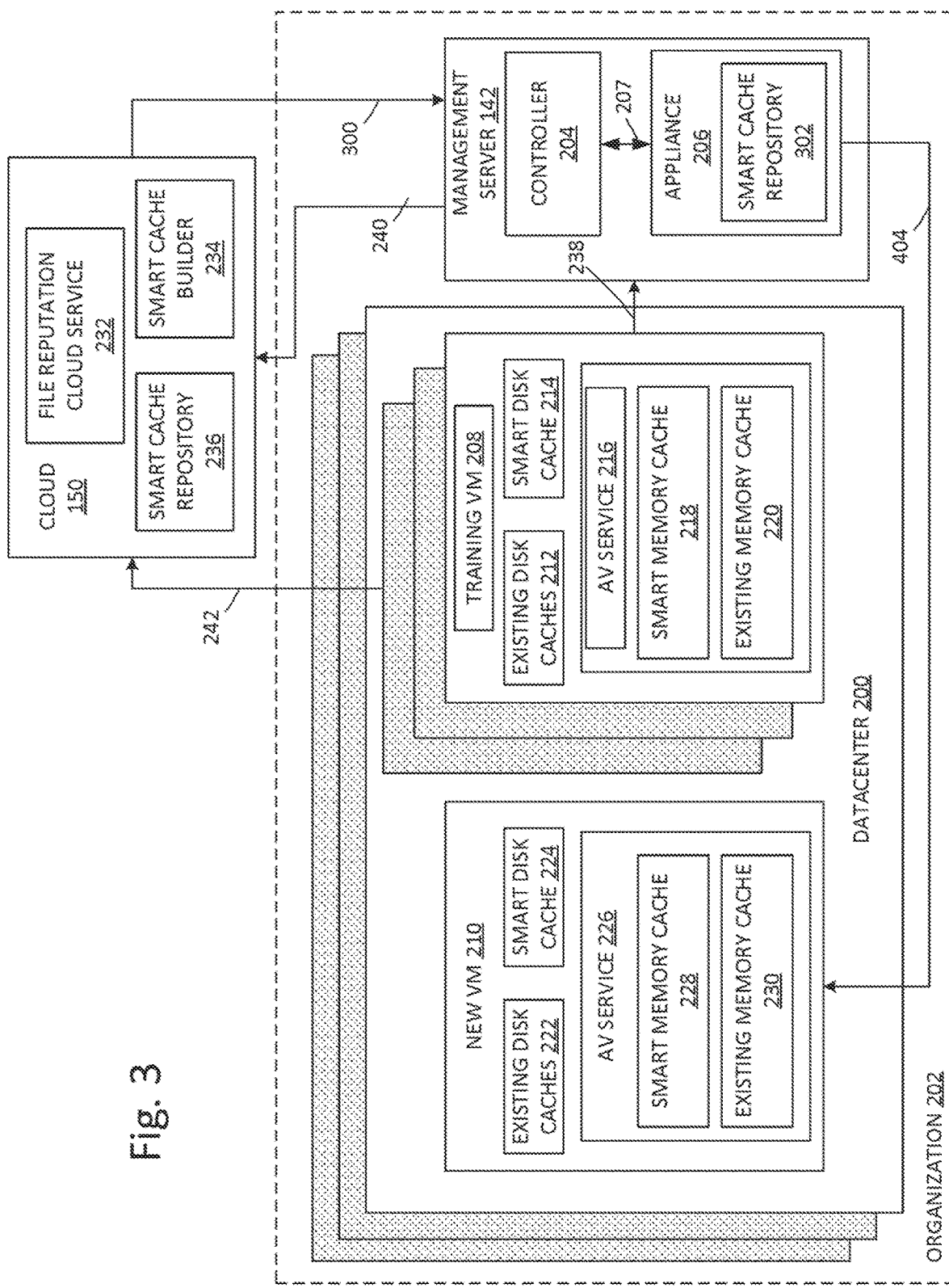
FIG. 3 is a schematic diagram illustrating some of the elements in the virtualized computing environment of FIG. 1 that are involved in a method to build and use a file reputation cache for an AV endpoint, according to a second approach.

FIG. 3 is a schematic diagram illustrating some of the elements in the virtualized computing environment 100 of FIG. 1 that are involved in a method to build and use a file reputation cache for an AV endpoint, according to a second approach. Elements similar to those shown in FIG. 2 are labeled with the same reference numbers in FIG. 3.

In the second approach of FIG. 3 and similar to the first approach of FIG. 2, the appliance 206 collects (shown at an arrow 238) datacenter and cluster information for AV endpoints (e.g., the training VM(s) 208) and sends (shown at an arrow 240) that information to the file reputation cloud service 232, for training the smart cache builder 234. Also similarly to the first approach of FIG. 2, the training VM(s) 208 sends (shown at an arrow 242) file reputation requests and other information pertaining to the VM(s) 208 to the file reputation cloud service 232, which is used for training purposes by the smart cache builder 234.

However in the second approach of FIG. 3, the file reputation(s) from the smart cache repository 236 are obtained (shown at an arrow 300) by the management server 142. Specifically, the appliance 206 downloads and stores the file reputation(s) in a smart cache repository 302 at the management server 142. The new VM 210 then obtains (shown at 304) the file reputation(s) from the appliance 206 rather than from the cloud 150, and stores the file reputation(s) at the smart disk cache 224 and/or the smart memory cache 228.

With the second approach of FIG. 3, local area network access may thus be used by an AV endpoint (e.g., the new VM 210) to communicate with the management server 142 to obtain updates for the file reputations in its smart caches, and such communication can be more effective from the network usage point of view (as opposed to communicating with the remote cloud 150).

Moreover, such communications can leverage existing communication protocols/techniques that used between VMs and the management server 142, without having to establish a separate/different form of communications. Still further, the second approach may be particularly suitable for AV endpoints that form part of the datacenter 200 or the virtualized computing environment 100.

Figure 4:
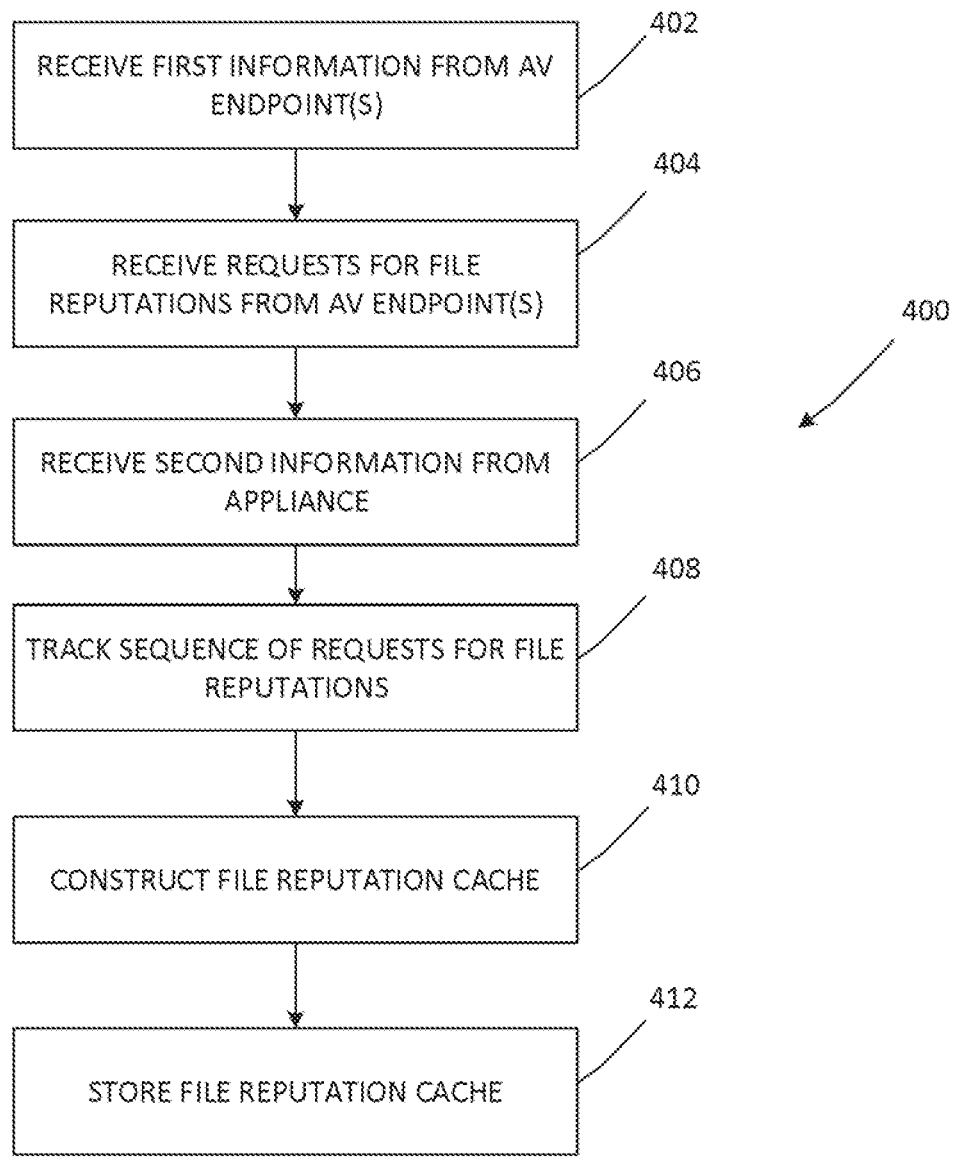
FIG. 4 is a flowchart of an example method to build a file reputation cache in a cloud service for use the virtualized computing environment of FIG. 1.

The techniques described herein to build an optimum/smart file reputation cache may comprise a two-step process/method that involves continuous learning and periodic deployment (including updates) of the file reputation cache. FIG. 4 is a flowchart of an example method 400 to build a file reputation cache in a cloud service for use the virtualized computing environment 100 of FIG. 1. Example method 400 may include one or more operations, functions, or actions illustrated by one or more blocks, such as blocks 402 to 412. The various blocks of the method 400 and/or of any other process(es) described herein may be combined into fewer blocks, divided into additional blocks, supplemented with further blocks, and/or eliminated based upon the desired implementation. In one embodiment, the operations of the method 400 and/or of any other process(es) described herein may be performed in a pipelined sequential manner. In other embodiments, some operations may be performed out-of-order, in parallel, etc.

According to one embodiment, at least some of the operations depicted in the method 400 may be performed by the smart cache builder 234 at the cloud 150 shown in FIGS. 2 and 3, in cooperation with the appliance 206 and the AV endpoints (e.g., the training VMs 208) that contribute training data/information to the cloud 150 to enable the smart cache builder 234 to build a smart file reputation cache. Elements in the cloud 150 alternatively or in addition to the smart cache builder 234 may perform some of the operations in the method 400 in other embodiments.

Beginning at a block 402 ("RECEIVE FIRST INFORMATION FROM AV ENDPOINT(S)"), the AV service 126 at the AV endpoint(s), such as the AV service 216 at the training VM 208, collects guest OS 122 information such as OS type, OS version, updates installed on the training VM 208, applications 124 installed on the training VM 208, running processes on the training VM 208, and other information pertaining to the AV endpoint. The smart cache builder 234 then receives this first information from the AV endpoint(s).

At a block 404 ("RECEIVE REQUESTS FOR FILE REPUTATIONS FROM AV ENDPOINT(S)"), the file reputation cloud service 232 receives real-time requests for file reputations from the AV endpoint(s). For example and as previously explained above, an application may be launching at the VM 208, and so its AV service 216 sends requests for file reputations for the application, its DLLs, etc. The file reputation cloud service 232 responds to these requests, for example, by comparing hashes in the requests with hashes in the file reputations, and provides a response to the VM 208 to indicate whether the hashes are matched. Moreover, the file reputation cloud service 232 provides/passes the requests for file reputations to the smart cache builder 234 to enable the smart cache builder 234 to also use the information in the requests for training/building.

At a block 406 ("RECEIVE SECOND INFORMATION FROM APPLIANCE"), the smart cache builder 234 receives second information from the appliance 206 at the management server 142. For instance, the appliance 206 (in cooperation with the controller 204) collects and sends information pertaining to the organization 202 (including the datacenter 200) to the cloud 150 for consumption as training data by the smart cache builder 234.

At a block 408 ("TRACK SEQUENCE OF REQUESTS FOR FILE REPUTATIONS"), the smart cache builder 234 continues to receive and track the sequence of requests for file reputations sent by the training VM(s) 208. For instance and as previously explained above, each particular application loads specific DLLs in a specific sequence during the launch process. Thus, the similar/same applications may exhibit the same DLL loading sequence that trigger a corresponding sequence of requests for file reputations, which may be different from another (different) application that loads different DLLs in a different sequence (and hence would trigger a different sequence of requests for file reputations).

The smart cache builder 234 is also aware of other details such as the policy group of the endpoint AV, which may be provided by the appliance 206 at the block 406. For example, AV endpoints with similar applications, functions, roles, etc. may be grouped into the same AV policy.

The block 408 may be followed by a block 410 ("CONSTRUCT FILE REPUTATION CACHE"), wherein the smart cache builder 234 constructs the smart file reputation based on the first information, second information, and other information obtained at blocks 402-408. Constructing an individual smart file reputation may involve, in some embodiments, the smart cache builder 234 consolidating its file reputation caches from multiple AV endpoints based on the similarity in parameters like OS version, updates installed on the AV endpoints, applications installed on the AV endpoints, application versions, running processes on the AV endpoints, etc.

The following is a non-exhaustive and non-limiting list of parameters that may be used by the smart cache builder 234 to construct a smart file reputation cache, including consolidating multiple file reputations into single smart file reputation caches based on similar parameters:

1. Frequency for a file reputation request for a particular hash from multiple AV endpoints;
2. Organization information, including system administration-based information, such as user and group information;
3. Datacenter information, including VM inventory information, datacenter name, cluster name, etc. This information can be collected by the appliance 206 with the help of the controller 204;
4. Policy on the AV endpoint (e.g., standard/customized security policy);
5. Type of file (.exe, .dll, .sys, etc.);
6. Size of the file;
7. Signing status of the file;
8. Timestamp of the file;
9. Security attributes of the file;
10. Grouping of files based on the files being accessed in certain periods of time;
11. User-specified grouping criteria;
12. Grouping of VMs or other AV endpoints that are closed from the same source;
13. Other parameters, including combinations thereof.

In some embodiments, the smart cache builder 234 may construct multi-layer file reputation caches, wherein the selection/configuration of one or more particular smart file reputation caches that match with a particular file and/or AV endpoint may be based on at least the following (for example):

a. File reputations are listed in a priority order to construct multiple caches based on the above-listed parameters 1-9;
b. Caches having a higher probability of a hit for a file reputation request are listed first a sequence of caches;
c. Smart caches for in-memory deployment (e.g., for storage in the smart memory cache 218 in FIGS. 2 and 3) in an AV process, which is a smaller subset of file reputations, will be primary caches;
d. Smart caches for storage on persistent disk (e.g., for storage in the smart disk cache 214 in FIGS. 2 and 3), which will be a bigger subset of file reputations, will be secondary caches;
e. Sizes of smart caches can be customizable based on customer/user configuration so as to avoid excessive usage of system resources at the AV endpoint;
f. Smart caches may be updated periodically for better runtime performance based on the above-listed parameters 1-9;
g. A smart cache manager (e.g., at the cloud 150) maintains multiple caches based on OS type, OS version, updates installed on the AV endpoints, applications installed on the AV endpoints, application version, running processes on the AV endpoints, etc.; and
h. Combining smart caches with existing real-time requests-based caches, so as to increase the effectiveness/efficiency of resolving file reputation requests.

The block 410 may be followed by a block 412 ("STORE FILE REPUTATION CACHE") in which the smart cache builder 234 stores the constructed smart file reputation cache in the smart cache repository 236. The stored file reputation cache can thereafter be downloaded to the new VM 210 or to the smart cache repository 302 at the management server 142, for use by the new VM 210 when the new VM 210 is installed. Further in some embodiments, the stored file reputation can also be downloaded to existing VMs 208 for their use, so as to enable the existing VMs to eventually replace direct requests to the cloud 150 for file reputations with requests for file reputations from local cache. The smart cache builder 234 can also update the smart reputation caches stored in the smart cache repository 236.

Figure 5:
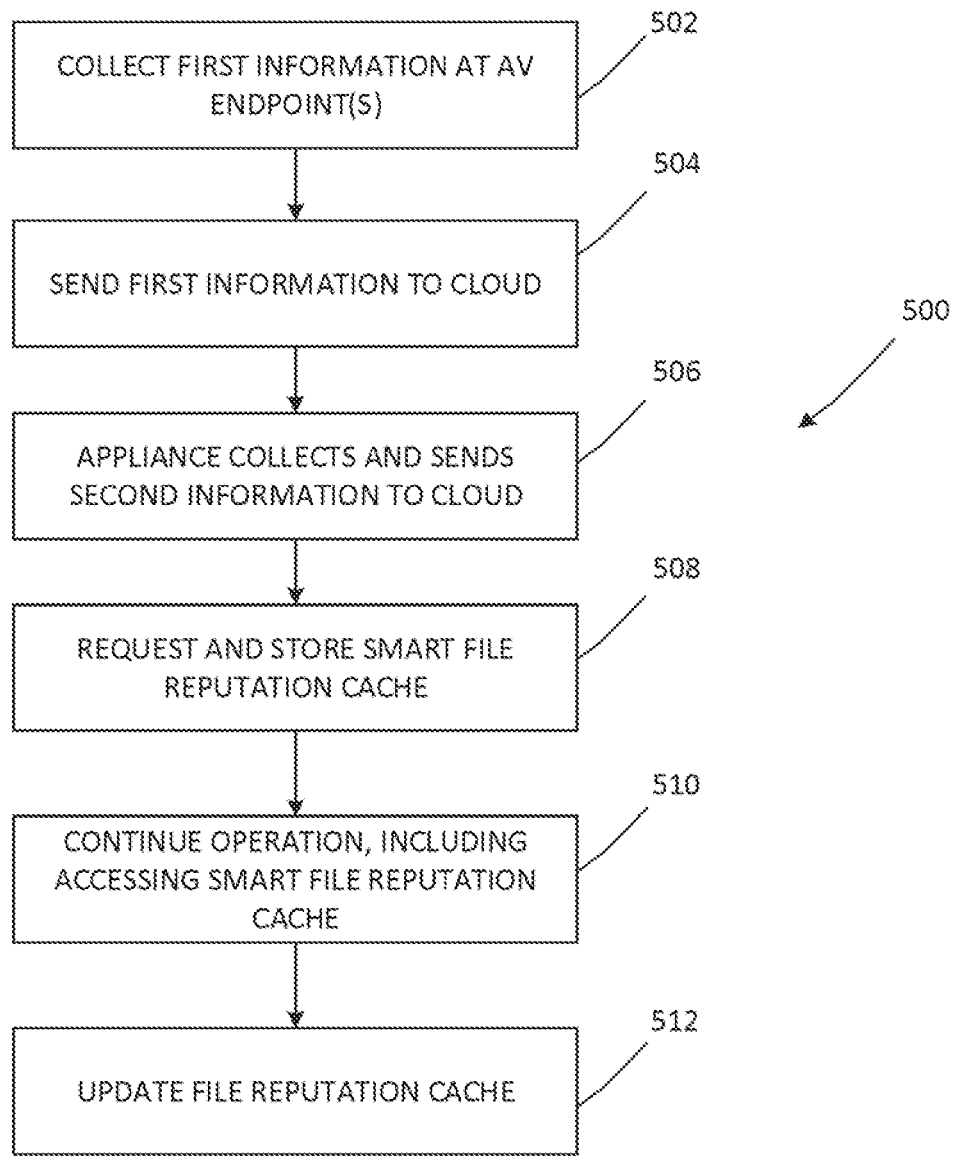
FIG. 5 is a flowchart of an example method to deploy a file reputation cache for a newly installed AV endpoint in the virtualized computing environment of FIG. 1.

FIG. 5 is a flowchart of an example method 500 to deploy a file reputation cache for a newly installed AV endpoint in the virtualized computing environment 100 of FIG. 1. At least some of the operations depicted in the method 500 may be performed, for example, by the new VM 210 that has just been installed, in cooperation with the cloud 150 and the management server 142.

At a block 502 ("COLLECT FIRST INFORMATION AT AV ENDPOINT(S)"), the new VM 210 collects first information such as guest OS 122 information including OS version, updates installed on the VM 210, applications 124 installed on the VM 210, running processes on the VM 210, etc.

The block 502 may be followed by a block 504 ("SEND FIRST INFORMATION TO CLOUD"), wherein the new VM 210 sends the collected first information to file reputation cloud service 232 at the cloud 150. At a block 506 ("APPLIANCE COLLECTS AND SENDS SECOND INFORMATION TO CLOUD"), the appliance 206 (in cooperation with the controller 204) collects and sends information about the organization 202 and the datacenter 200 to the cloud 150. Based on the first information and the second information, the file reputation cloud service 232 can determine and select which of the stored smart file reputation caches in the smart cache repository 236 matches/corresponds with the new VM 210.

The block 506 may be followed by a block 508 ("REQUEST AND STORE SMART FILE REPUTATION CACHE"), wherein the new VM 210 requests a smart file reputation cache from the cloud 150 (e.g., such as shown in FIG. 2) or from the management server 142 (e.g., such as shown in FIG. 3). The new VM 210 receives the requested file reputation cache, such as by pulling or having pushed to it, and stores the file reputation cache in the smart disk cache 224 and/or the smart memory cache 228.

The block 508 may be followed by a block 510 ("CONTINUE OPERATION, INCLUDING ACCESSING SMART FILE REPUTATION CACHE") wherein the new VM 210 continues its operation, including launching/executing files. During such launch/execution, the new VM 210 may access the smart file reputation cache to verify the file reputation of the file, DLL, etc. For instance, the new VM 210 may perform lookups into the smart file reputation cache, so as to determine whether the hash of the file can be matched with a hash in the smart file reputation cache.

The block 510 may be followed by a block 512 ("UPDATE FILE REPUTATION CACHE") wherein the new VM 210 may periodically request (from the cloud 150 and/or the management server 142) for updates to its cache, based on events such as OS upgrades, application installations, etc. that occur at the new VM 210.

Figure 6:
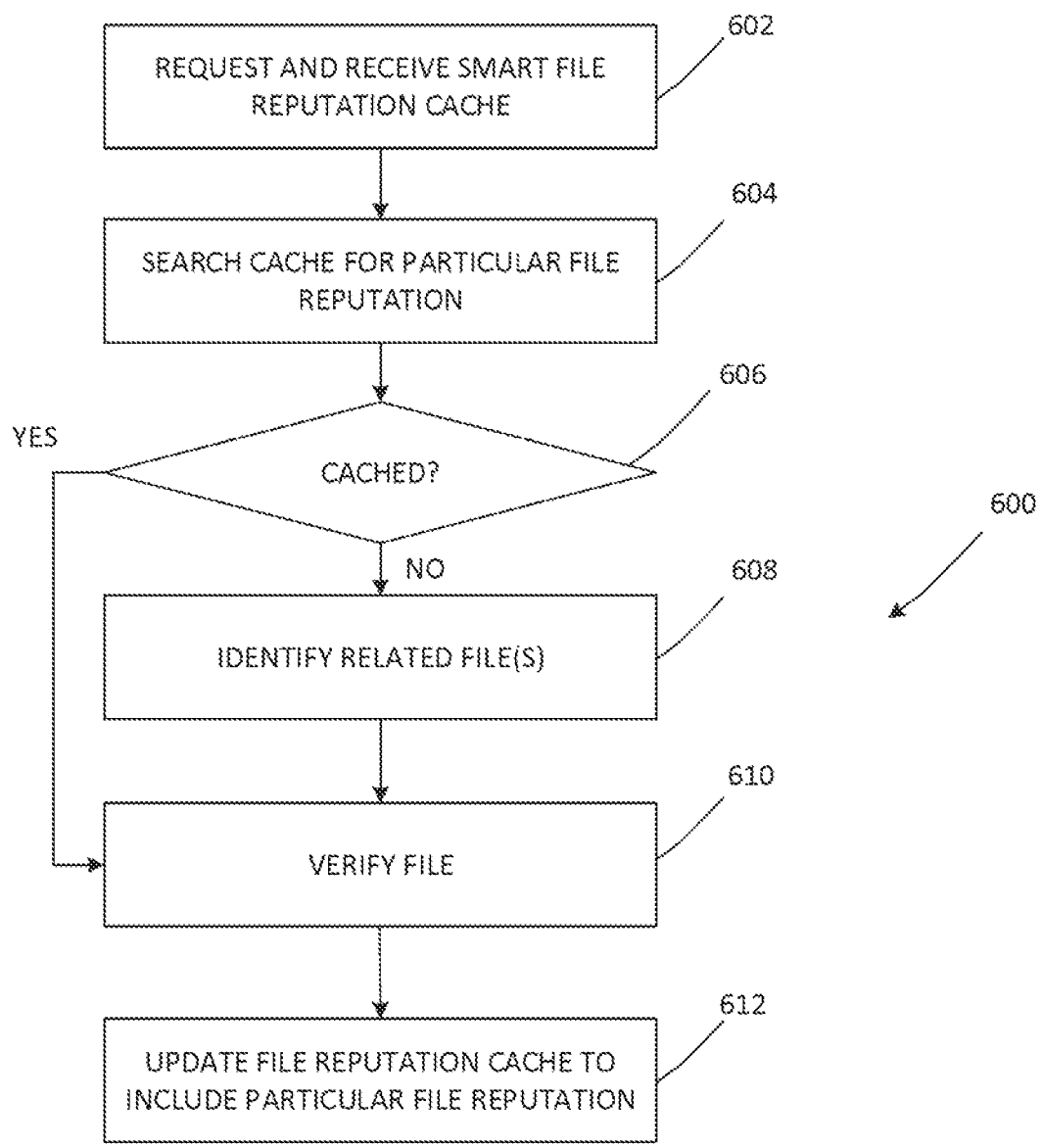
FIG. 6 is a flowchart of an example method for an AV endpoint in the virtualized computing environment of FIG. 1 to use a file reputation cache.

FIG. 6 is a flowchart of an example method 600 for an AV endpoint in the virtualized computing environment 100 of FIG. 1 to use a file reputation cache. More particularly, the method 500 illustrates operations associated with responding to a request for a file reputation that is sent from a VM to a local file reputation cache. For example, the method 600 may be performed by the new VM 210 and/or an existing VM 208 and may correspond to the some of the operations performed in blocks 508-512 in FIG. 5.

At a block 602 ("REQUEST AND RECEIVE SMART FILE REPUTATION CACHE"), the new VM 210 requests a smart file reputation cache from the cloud 150 or from the management server 142, and receives the smart file reputation cache. The new VM 210 may then locally store the smart file reputation cache.

The block 602 may be followed by a block 604 ("SEARCH CACHE FOR PARTICULAR FILE REPUTATION"), wherein file at the VM 210 launches, and the AV service 226 searches the local smart file reputation cache for a particular file reputation having a hash that corresponds to a hash of the launching file. If the particular file reputation is found in the file reputation cache ("YES" at a block 606), as a result of matching hashes, then the file is verified as being authentic/permitted at a block 610 ("VERIFY FILE").

If, however, the particular file reputation is not found in the file reputation cache ("NO" at the block 606), then the AV service 226 sends a file reputation request to the cloud 150 or to the management server 142. At a block 606 ("IDENTIFY RELATED FILE(S)"), the file reputation cloud service 232 or the appliance 206 identifies the other files for which the AV endpoint sends requests for file reputations after sending a request for the particular file. The file reputation cloud service 232 or the appliance 206 then returns back (to the VM 210) the file reputation of the particular file and additional/other files that are related to the particular file, at the block 610 in which the particular file is thus verified to be authentic/permitted. A file may be deemed to be related to another file if: its file reputation is requested in a close time proximity relative to the particular file, and the files are part of the same application.

The block 610 may be followed by a block 612 ("UPDATE FILE REPUTATION CACHE TO INCLUDE PARTICULAR FILE REPUTATION"), wherein the new VM 210 stores the hash(es) for the particular file and for the related files (if appropriate) in its local cache, thereby updating the file reputation cache.

Therefore with the foregoing implementations, various advantages and features are provided. For example, there is a reduced number of hash calculations at the AV endpoint, since the hash calculations may be performed at the cloud when building a file reputation cache. Moreover, providing a local file reputation cache reduces the number of requests made over a network to the cloud. Still further, there is improved performance and efficiency of the AV endpoint and the applications installed therein, due to being able to more readily and quickly access a local cache instead of a remote cloud.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-6. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to provide locally cached file reputations such as described herein.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method to build and use a file reputation cache, the method comprising:
    sending file reputation requests from a first antivirus (AV) endpoint in an organization to a cloud;
    collecting, with the first AV endpoint, first information pertaining to the first AV endpoint;
    collecting, with a management server that manages AV endpoints in the organization, second information pertaining to the organization;
    sending the collected first information and the collected second information to a cache builder at the cloud to train the cache builder to construct the file reputation cache based on the first information, the second information, and the file reputation requests sent from the first AV endpoint to the cloud;
    receiving, at a second AV endpoint in the organization, the file reputation cache; performing, by the second AV endpoint, a local query on the received file reputation cache for a particular file reputation that corresponds to a particular file being launched at the second AV endpoint; and
    in response to the local query not finding the particular file reputation in the file reputation cache, sending a request for the particular file reputation to the cloud to enable the cloud to identify at least one file that is related to the particular file and to provide a file reputation of the at least one file as a response to the request for the particular file reputation.

2. The method of claim 1, wherein:
    the first AV endpoint is a first virtual machine supported by a hypervisor in a datacenter;
    the management server comprises a virtual appliance comprising a single purpose virtual machine in the datacenter; and
    the method further comprises:
        running, on the hypervisor, a first component of a security program;
        running, on the first virtual machine, a second component of the security program; and
        running, on the management server, a third component of the security program.

3. The method of claim 1, further comprising:
    receiving, at the management server, the file reputation cache from the cloud;
    wherein receiving, at the second AV endpoint, the file reputation cache comprises receiving, at the second AV endpoint, the file reputation cache from the management server.

4. The method of claim 1, wherein the first information includes information that specifies at least one of: an operating system (OS) type of the first AV endpoint, an OS version, updates installed on the first AV endpoint, applications installed on the first AV endpoint, and running processes on the first AV endpoint.

5. The method of claim 1, wherein the second information includes information that specifies at least one of: contextual information, information regarding a datacenter of the organization, cluster names of hosts in the datacenter, user groups, and virtual computing instance names.

6. The method of claim 1, further comprising updating the file reputation cache at the second AV endpoint in response to an event that occurs at the second endpoint.

7. The method of claim 1, further comprising:
    permitting the particular file to execute in response to the local query having located the particular file reputation in the file reputation cache.

8. A non-transitory computer-readable medium having stored thereon instruction executable by one or more processors to perform operations comprising:
    sending file reputation requests from a first antivirus (AV) endpoint in an organization to a cloud;
    collecting, with the first AV endpoint, first information pertaining to the first AV endpoint;
    collecting, with a management server that manages AV endpoints in the organization, second information pertaining to the organization;
    sending the collected first information and the collected second information to a cache builder at the cloud to train the cache builder to construct the file reputation cache based on the first information, the second information, and the file reputation requests sent from the first AV endpoint to the cloud;

receiving, at a second AV endpoint in the organization, the file reputation cache; and performing, by the second AV endpoint, a local query on the received file reputation cache for a particular file reputation that corresponds to a particular file being launched at the second AV endpoint; and in response to the local query not finding the particular file reputation in the file reputation cache, sending a request for the particular file reputation to the cloud to enable the cloud to identify at least one file that is related to the particular file and to provide a file reputation of the at least one file as a response to the request for the particular file reputation.

9. The non-transitory computer-readable medium of claim 8, wherein:

the first AV endpoint is a first virtual machine running on a hypervisor in a datacenter;

the management server comprises a virtual appliance comprising a single purpose virtual machine in the datacenter; and the operations further comprise:
running, on the hypervisor, a first component of a security program;
running, on the first virtual machine, a second component of the security program; and
running, on the management server, a third component of the security program.

10. The non-transitory computer-readable medium of claim 8, further comprising:

receiving, at the management server, the file reputation cache from the cloud;

wherein receiving, at the second AV endpoint, the file reputation cache comprises receiving, at the second AV endpoint, the file reputation cache from the management server.

11. The non-transitory computer-readable medium of claim 8, wherein the first information includes information that specifies at least one of: an operating system (OS) type of the first AV endpoint, an OS version, updates installed on the first AV endpoint, applications installed on the first AV endpoint, and running processes on the first AV endpoint.

12. The non-transitory computer-readable medium of claim 8, wherein the second information includes information that specifies at least one of: contextual information, information regarding a datacenter of the organization, cluster names of hosts in the datacenter, user groups, and virtual computing instance names.

13. The non-transitory computer-readable medium of claim 8, wherein the operations further comprise:

updating the file reputation cache at the second AV endpoint in response to an event that occurs at the second endpoint.

14. The non-transitory computer-readable medium of claim 8, wherein the operations further comprise:

permitting the particular file to execute in response to the local querying having located the particular file reputation in the file reputation cache; and in response to failing to locate the particular file reputation in the file reputation cache, sending a request for the particular file reputation to the cloud to enable the cloud to identify at least one file that is related to the particular file and to provide a file reputation of the at least one file as a response to the request for the particular file reputation.

15. A system, comprising:

a first antivirus (AV) endpoint in an organization;

a second AV endpoint in the organization; and a management server that manages operation of the first AV endpoint and the second AV endpoint, wherein:

the first AV endpoint is configured to send file reputation requests to a cloud;

the first AV endpoint is configured to collect first information pertaining to the first AV endpoint;

the management server is configured to collect second information pertaining to the organization;

the first AV endpoint is configured to send the collected first information and the management server is configured to send the collected second information, to a cache builder at the cloud to train the cache builder to construct a file reputation cache based on the first information, the second information, and the file reputation requests sent from the first AV endpoint to the cloud;

the second AV endpoint is configured to receive the file reputation cache;

the second AV endpoint is configured to perform a local query on the received file reputation cache for a particular file reputation that corresponds to a particular file being launched at the second AV endpoint; and in response to the local query not finding the particular file reputation in the file reputation cache, send a request for the particular file reputation to the cloud to enable the cloud to identify at least one file that is related to the particular file and to provide a file reputation of the at least one file as a response to the request for the particular file reputation.

16. The system of claim 15, wherein:

the first AV endpoint comprises a virtual machine (VM) running supported by a hypervisor in a datacenter;

the management server is a virtual appliance comprising a single purpose virtual machine in the datacenter;

the hypervisor is configured to run a first component of a security program;

the VM is configured to run a second component of the security program as an AV service; and the management server is configured to run a third component of the security program.

17. The system of claim 15, wherein the second AV endpoint is configured to receive the file reputation cache from the management server, and wherein the management server is configured to receive the file reputation cache from the cloud.

18. The system of claim 15, wherein the first information includes information that specifies at least one of: an operating system (OS) type of the first AV endpoint, an OS version, updates installed on the first AV endpoint, applications installed on the first AV endpoint, and running processes on the first AV endpoint.

19. The system of claim 15, wherein the second information includes information that specifies at least one of: contextual information, information regarding a datacenter of the organization, cluster names of hosts in the datacenter, user groups, and virtual computing instance names.

20. The system of claim 15, wherein the second AV endpoint updates the file reputation cache at the second AV endpoint in response to an event that occurs at the second endpoint.

21. The system of claim 15, wherein:
the second AV endpoint is configured to permit the particular file to execute in response to the local query having located the particular file reputation in the file reputation cache.

* * * * *